(12) United States Patent
Ickes, III et al.

(10) Patent No.: US 8,381,353 B2
(45) Date of Patent: Feb. 26, 2013

(54) RECESSED SIDE COMPARTMENT FOR SURFACE MAINTENANCE MACHINES

(75) Inventors: John C. Ickes, III, Rockford, MN (US); Margaret L. Bogren, Plymouth, MN (US)

(73) Assignee: Tennant Company, Minneapolis, MN (US)

( * ) Notice: Subject to any disclaimer, the term of this patent is extended or adjusted under 35 U.S.C. 154(b) by 74 days.

(21) Appl. No.: 12/940,714

(22) Filed: Nov. 5, 2010

(65) Prior Publication Data

US 2012/0112493 A1    May 10, 2012

Related U.S. Application Data

(60) Provisional application No. 61/258,642, filed on Nov. 6, 2009.

(51) Int. Cl.
*E01H 1/08* (2006.01)
(52) U.S. Cl. .......................... 15/340.1; 108/44
(58) Field of Classification Search ............... 15/340.1, 15/401; 16/382; 248/214, 215; 211/75; 312/263; 108/44, 46
See application file for complete search history.

(56) References Cited

U.S. PATENT DOCUMENTS

| | | | |
|---|---|---|---|
| 4,447,099 | A | 5/1984 | French |
| 5,114,108 | A | 5/1992 | Olschansky |
| 2002/0148068 | A1 | 10/2002 | Legatt |

OTHER PUBLICATIONS

International Search Report and Written Opinion, dated Jan. 18, 2011 for PCT Application No. PCT/US2010/055665, 13 pages.

*Primary Examiner* — Lori Lyjak
(74) *Attorney, Agent, or Firm* — Fredrikson & Byron, P.A.

(57) ABSTRACT

A surface maintenance vehicle having a low profile recessed cavity in the side of the vehicle beneath the driver's seat which can be used for transporting items. The vehicle includes a vehicle shroud containing operational components of the vehicle, a driver's seat, and a seat shroud. A recessed cavity is formed in the side surface of the seat shroud and includes a vertically oriented anterior surface, a vertically oriented posterior surface opposing the anterior surface, a horizontally oriented bottom surface, wherein the bottom surface is generally perpendicular to the anterior and posterior surfaces, and a vertically oriented inner surface, wherein the inner surface is generally perpendicular to the anterior surface, posterior surface and bottom surface. The recessed cavity is open on the side and the top and can be used for transporting items while not increasing the overall size or footprint of the surface maintenance machine.

20 Claims, 6 Drawing Sheets

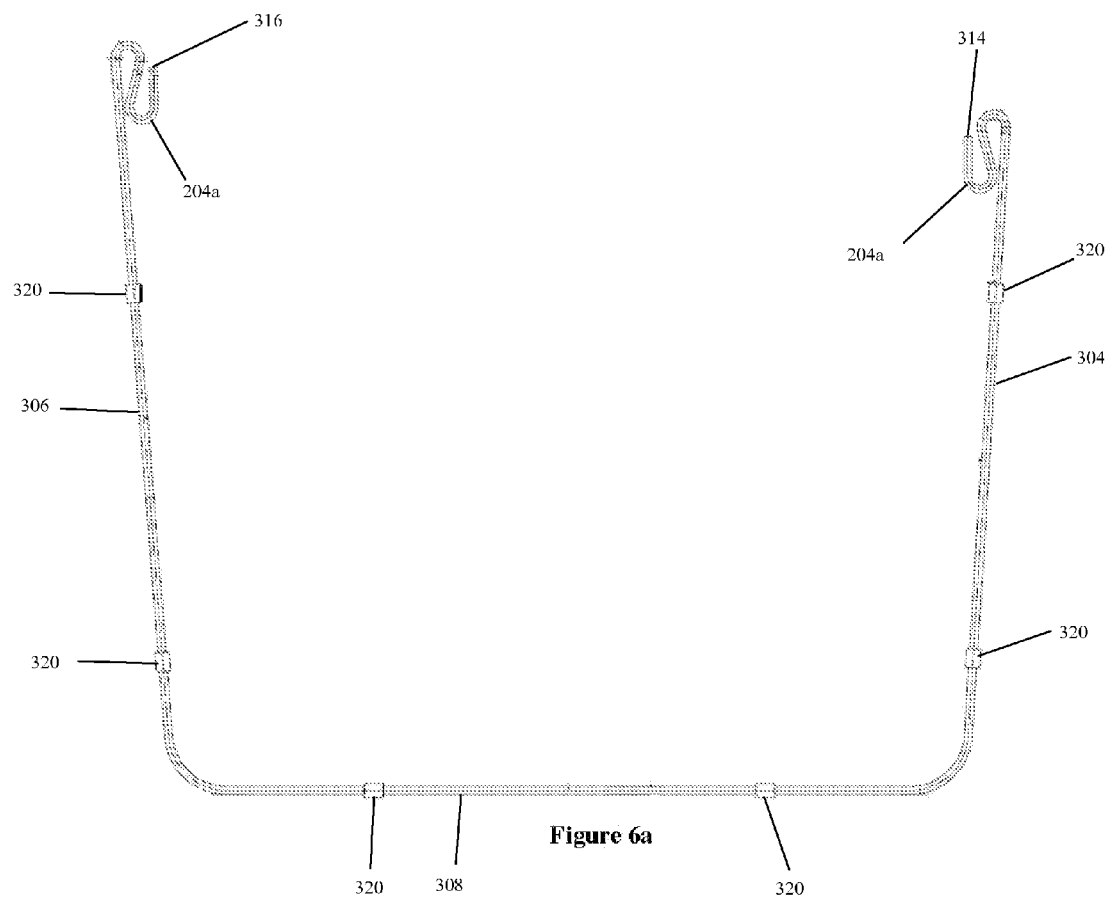
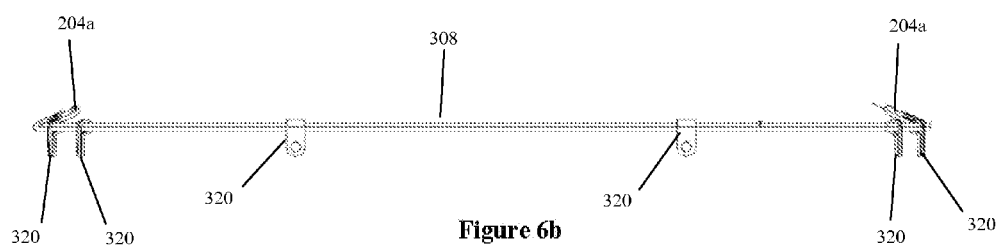

RECESSED SIDE COMPARTMENT FOR SURFACE MAINTENANCE MACHINES

PRIORITY CLAIM

This application claims priority to U.S. Provisional Application No. 61/258,642, filed Nov. 6, 2009, the contents of which are hereby incorporated by reference in its entirety.

BACKGROUND

Surface maintenance machines broadly encompass machines which will sweep commercial or industrial areas such as factory floors, hallways or the like, and machines which will perform a scrubbing function in that same environment. As such, surface maintenance machines include machines which are designed to perform either scrubbing or sweeping or both sweeping and scrubbing functions.

The size and dimensions of the surface maintenance machine used for a particular job relates to the type of location in which the machine will be used. However, in most cases, it is desirable for the machines to be able to clean surfaces along the edges of the floor, such as where the floors abuts with the wall, equipment, or other edges or obstructions. That is, the machine must be able to clean the entire floor surface, up to the outermost edges, without leaving any uncleaned gaps. In addition, it is desirable to clean a wide pathway with each pass of the machine. In order to perform these functions, the sweeping and scrubbing brushes of surface maintenance machines typically extend the full width of the machine. In addition, in order to allow the machines to pass directly against wall surfaces to avoid cleaning gaps, the machines typically do not include any parts which extend or project laterally beyond the sides of the machines but rather are relatively flat on their sides. In this way, the machines can run directly along a wall to clean the floor at the edges.

In addition to maintaining flat side surfaces, the width of the machine for a particular use must also take into consideration the physical space which is to be cleaned. For example, surface maintenance machines having a wider set of brushes can clean a wider pathway with each pass of the machine, allowing for fewer passes of the machine and therefore quicker cleaning. However, the machines must also be able to pass through certain narrow spaces, such as doorways or other restrictions, which may limit the width of the machines. As such, the size of the machines may be restricted due to physical requirements of the location in which they are used.

It is further desirable to for surface maintenance machines to be able to operate for as long as possible without needing to stop. For example, such machines need to periodically stop to empty their hoppers of waste, eliminate and replace water, replace cleaning solutions, and refuel the machines or recharge the batteries. In some cases, the machines may have to travel some distance from the surfaces to be cleaned to a separate area to perform these functions. As a result, time is lost in emptying and replenishing the machines as well as in travel to and from the locations to be cleaned. Therefore, to minimize this loss of time and inefficiency, surface maintenance machines attempt to maximize running time by maximizing the storage capacity of water, cleaning fluids and waste materials, as well as the fuel or battery storage, for example.

Space for the operational components of surface maintenance machines is limited by the dimensions of the machines, which are sized according to the spatial requirements of the location in which they are used. Therefore, while it is desirable for the surface maintenance machines to be continuously operable for as long as possible, the space for operational components required to extend the operation of the machines is limited by the dimensions of the machine. Surface maintenance machines therefore typically use all available space within the dimensions of the machine to maximize the running time of the machines. Typically, as much space as possible is used for the storage or water and the other components required to maximize the running time of the machines. As such, the space and volume restrictions make it difficult to incorporate other space occupying features into such machines.

One feature which is not typically provided in space limited surface maintenance machines is a storage compartment. Such compartments, if provided in the traditional manner, would occupy too much space in the machines and therefore have not been provided. Furthermore, they cannot be affixed to the outside of the machines as they would interfere with the ability of the machines to clean along floor edges directly against walls. However, it would be useful to include storage compartments for the storage or transportation of articles such a signs or for the removal of waste materials encountered by the operator while cleaning the surfaces but which cannot be removed by the machines.

SUMMARY

In some embodiments, the invention includes a surface maintenance machine having a seat mounted on an upper surface of a seat shroud. The seat shroud includes a side surface having a recess cavity having four surfaces including an inside surface, an anterior surface, a posterior surface and a bottom surface. The recess is shallow and does not extend laterally beyond the side of the machine. The recess does not include an outside surface or outside wall and is exposed laterally toward the outside of the machine. In this way, items may be stored within the recess cavity that are larger than the cavity by extending laterally outside of the space provided by the recess.

In some embodiments, the surface maintenance machine includes a seat mounted on an upper surface of a seat shroud, and a recess located on a side surface of the seat shroud. The recess includes an anterior wall portion extending laterally outward from the side surface of the seat shroud and forming an anterior surface of the recess. The recess cavity further includes a rear wall portion extending laterally outward from the side surface, rearward from the anterior wall portion, in forming the rear surface of the recess. In some embodiments, the recess further includes a bottom wall portion extending laterally outward from the side surface of the seat shroud and extending from the anterior wall portion to the rear wall portion, to form a bottom surface of the recess. In some embodiments, the recess further includes an upper wall portion extending vertically upward from an upper surface of the seat shroud.

In some embodiments, the recess further includes one or more attachment mechanisms. In some embodiments, one or more attachment mechanisms are located along the sides of the recess on an anterior surface and posterior surface of the recess. In some embodiments, the attachment mechanisms are hooks. In other embodiments the attachment mechanisms are eyelets, press-in hooks, or hook and loop material. In some embodiments, the recess includes apertures into which threaded inserts may be inserted for use with one or more attachment mechanisms. In some embodiments, the recess may further include an stretchable material attached to the anterior surface and posterior surface of the recess and spaced away from the inside surface.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 6a is a side view of a frame for use in machines according to embodiments of the invention; and FIG. 6b is a bottom view of the frame of FIG. 6a.

DETAILED DESCRIPTION

The following detailed description is exemplary in nature and is not intended to limit the scope, applicability, or configuration of the invention in any way. Rather, the following description provides practical illustrations for practicing exemplary embodiments of the present invention. Disclosed embodiments will hereinafter be described in conjunction with the appended drawings, wherein like numerals denote like elements. The drawings are illustrative of particular exemplary embodiments and methods and therefore do not limit the scope of the invention. The drawings are not necessarily to scale and are intended for use in conjunction with the explanations in the following detailed description. Those skilled in the art will recognize that many of the examples provided have suitable alternatives that can be utilized.

Embodiments of the invention provide a space for storage and transportation for use with surface maintenance machines. All available space within such machines is typically occupied by bulky operational components such as water storage tanks and batteries, yet the machines must maintain a flat exterior side surface to allow them to operate directly adjacent to wall surfaces or along other similar edges adjacent to such as machinery. Embodiments of this invention therefore create a shallow recess cavity within the sidewall of the machine, in the seat shroud, to function as a storage cavity.

Figure 1:
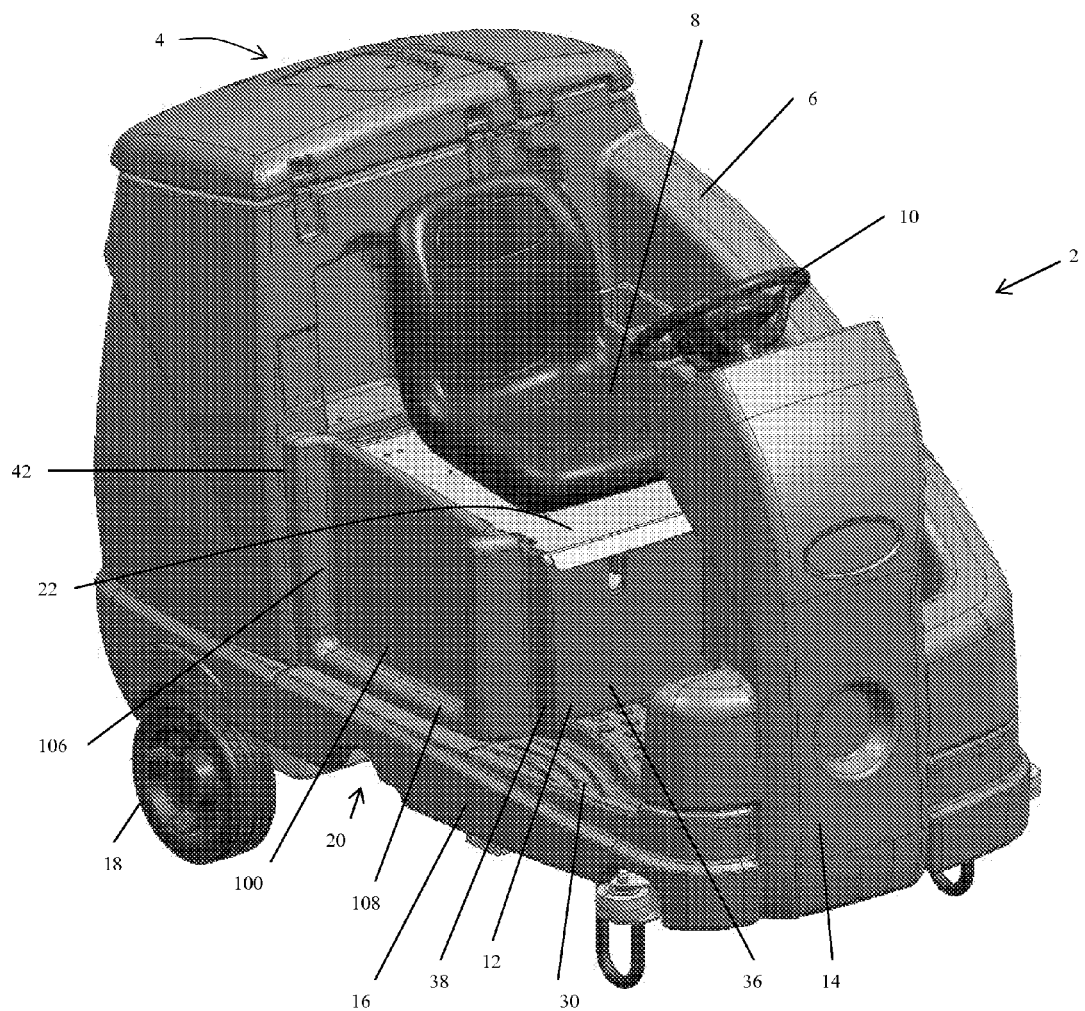
FIG. 1 is a front side view of a machine according to embodiments of the invention.

Embodiments of the invention may be used with any surface maintenance machines, including sweepers, scrubbers and combination sweepers and scrubbers. An embodiment of the invention is shown in FIG. 1. A storage recess or recessed cavity 100 is provided in the seat shroud 12, recessed into the exterior surface of the maintenance machine 2. The recess 100 is shallow and does not extend or project laterally beyond the side of the machine 2 but rather forms a storage space within the generally flat-sided footprint of the machine.

Figure 2:
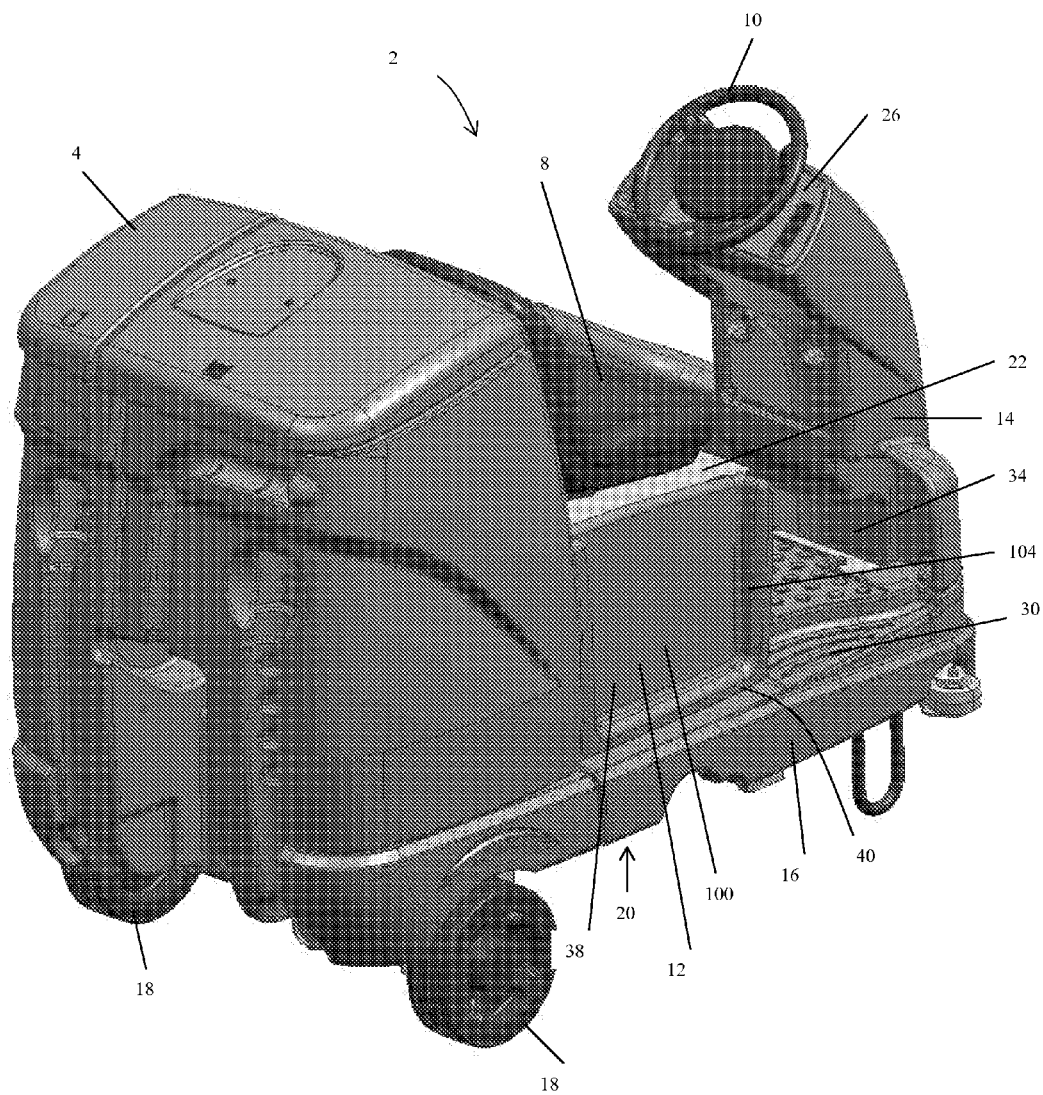
FIG. 2 is a rear side view of a machine according to embodiments of the invention.

FIGS. 1 and 2 are front and rear side views, respectively, of an exemplary surface maintenance machine 2 which may be used in embodiments of the invention. FIGS. 1 and 2 illustrate a machine 2 including one or more rear compartments 4, in which a tank of scrubbing fluid and a recovery tank may be contained, for example, as well as optional filtering components. The machine 2 further includes a side compartment 6 adjacent to the seat 8 and located on a first side of the machine 2. The side compartment 6 may contain a clean water tank. The machine 2 further includes a steering wheel 10, which is positioned forward relative to the seat 8, so that a seated operator of machine 2 may steer the machine 2. The machine 2 may be powered by one or more batteries that may be contained in a compartment beneath the seat 8 formed by the seat shroud 12 and may include a motor which is integrated with the drive wheel. In alternative embodiments, the space within the seat shroud 12 may be occupied by one or more fuel tanks and the machine 2 may further include an engine which may be located behind the seat 8 or next to the seat 8. The machine 2 also includes a frame which is enclosed in a frame shroud 16, and wheels 18. Although the locations of the various tanks, batteries, and other operational components of the machines may vary between machines 2, it should be appreciated that available space is used by these operational components in a similar manner in order to extend the running time of the machines 2.

Although not shown, various sweeping and/or scrubbing brushes may be mounted to extend from an underside 20 of the machine 2. In addition, in machines 2 which perform surface scrubbing, a vacuum-assisted squeegee is mounted to extend from a the underside 20 of the machine 2 rearward of the scrubbing brushes. Fluid, for example, clean water, which may be mixed with a detergent, is dispensed from the scrubbing fluid tank to the floor beneath machine 2, in proximity to the scrubbing brushes, and soiled scrubbing fluid is vacuumed up by the squeegee into the recovery tank. Machines 2 which perform surface sweeping may also include a hopper on the underside 20 of the machine, into which dirt or debris may be directed from the sweeping brushes and then stored until disposal. The machine 2 may also includes a feedback control system to operate these and other elements of machine 2, according to apparatus and methods which are known to those skilled in the art.

The drivers seat 8 is mounted on the upper surface 22 of the seat shroud 12. The driver may control the machine 2 using the steering wheel 10, instrument panel 26, and one or more foot pedals or controls 28. The driver enters and exits the machine 2 through the second side of the machine 2, which is the side on which the recess 100 is located. The side may further include a step 30 to assist the driver in entering and exiting the machine 2. It further includes a passageway 34 or opening in the second side, between the front compartment 14 of the machine 2 and the seat shroud 12, through which the driver's feet and lower legs can pass comfortably. In the embodiment shown, there is no passageway for the driver's feet and legs on the first side of the machine 2. Rather, the side compartment 6 of the machine completely surrounds and encloses the driver's space and is used by operational components of the machine 2, such as auxiliary tanks as described above. In alternative embodiments, both the first and second sides of the machine 2 may include a passageway 34 for the driver to enter and exit the machine 2. In such embodiments, a recess cavity 100 may be located on either side of the machine 2, or on both sides of the machine 2. The seat shroud 12 supports the driver's seat 8 on its upper surface 22. The seat shroud 12 also has an anterior surface 36, which forms the back of the leg cavity, and a side surface 38, which forms part of the sidewall of the machine. The recessed cavity 100 is formed within this side surface 38 of the seat shroud 12.

Providing the recess 100 in the side surface 38 of the seat shroud 12 provides several advantages. First, it is located in a space which does not require a reduction in volume of any other operational components of the machine. This is particularly important, since the volume of the water, fluid and waste compartments and battery and fuel compartments must be maximized to avoid the need for frequent stops. Second, it is outside of the driver's riding space such as the leg cavity. This is useful in that it avoids cramping the driver and maintains the driver's comfort. Also, if the recess 100 is used for trash disposal, the driver avoids contacting the trash, which may be unsanitary, after it is deposited in the recess 100. Third, this location is quickly and easily accessible by the driver. For example, if the driver must exit the machine 2 to pick up a piece of trash, he will be passing this location to reenter the machine 2. The driver can therefore quickly deposit the trash into the recess 100 when mounting the machine 2, without the need to take additional steps around the machine 2, making the process more efficient.

Figure 3:
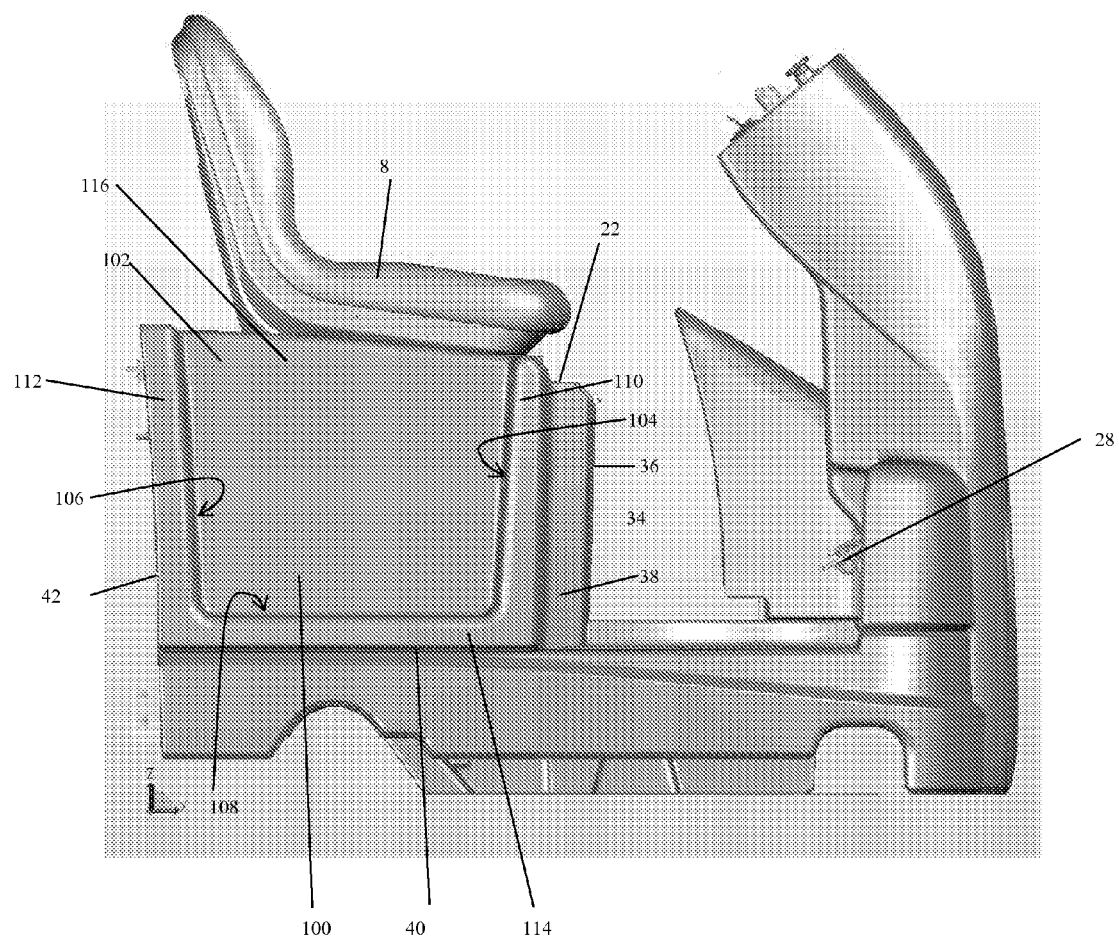
FIG. 3 is side view of a portion of a machine including a recess according to embodiments of the invention.

An embodiment of a recess 100 is shown in FIG. 3. The recess 100 as shown includes only 4 surfaces which define the recess space. The recess 100 includes an inside surface 102 that is the recessed vertically oriented inner wall of the recess 100. It also includes two vertically oriented side surfaces which are the anterior surface 104 located at the front of the space and the posterior surface 106 located at the back. The recess 100 also includes a bottom surface 108 located at bottom of the space. The anterior surface 104 is perpendicular to the inside surface 102 and is the forward most portion of the recess. The posterior surface 106 is also perpendicular to the inside surface 102 and faces and is approximately parallel to the anterior surface 104. The bottom surface 108 is perpendicular to the other three surfaces 102, 104, 106, extending from the anterior surface 104 to the posterior surface 106, and is approximately horizontal. The recess 100 does not include an outside surface, opposing the inside surface 102, but rather is exposed laterally on the outside. This provides important functional features of the recess 100 which will be described further below. However, in alternative embodiments the recess may include an outer surface extending from the bottom surface and part way up the recess. For example, the recess may include a small outer lip connected to the bottom surface and opposing the inner surface which forms a partial outer surface.

Embodiments of the recess 100 are typically shallow, having a depth which fits within the existing space on the side of the seat shroud 12. However, in order to maximize the space within the recess 100, the height of the space within the recess 100 may extend from at or near the upper surface 22 to at or near the bottom 40 of the seat shroud 12. Likewise the width may extend from at or near the anterior surface 36 to at or near the back 42 of the seat shroud 12. For example, the recess 100 may have a depth from inside to outside of about 2 inches to about 6 inches, such as from about 3 inches to about 4.5 inches, for example. The recess 100 may have a height from top to bottom of about 13 inches to about 20 inches, such as from about 15 inches to about 18 inches, for example. Finally, the recess 100 may have a width from anterior to posterior of from about 16 inches to about 24 inches, such as from about 18 inches to about 20 inches, for example. In some embodiments, the recess may extend vertically further upward, above the upper surface 22 of the seat shroud 12 to further maximize the space within the recess 100.

The recess 100 may be formed from the seat shroud 12 such as by molding to create the space. In some embodiments, the seat shroud 12 may include wall portions which project laterally outward from the side surface 38 of the seat shroud 12. An anterior wall portion 110 extends vertically from approximately the upper surface 22 to the bottom 40 of the seat shroud 12, with the rearward surface of the anterior wall portion 110 forming the anterior surface 104 of the recess 100. A posterior wall portion 112 likewise extends vertically from approximately the upper surface 22 to the bottom 40 of the seat shroud 12, with the anterior surface of the posterior wall portion 112 forming the posterior surface 106 of the recess. In the embodiment shown, the recess cavity also includes a bottom wall portion 114, extending horizontally from the anterior surface 36 to the back 42 of the seat shroud 12. The upper surface of the bottom wall portion 114 forms the bottom surface 108 of the recess 100. In alternative embodiments, the seat shroud 12 may not include a bottom wall portion 114 but rather the anterior and posterior wall portions 110, 112 may extend through the seat shroud 12 forming a shallow channel which is open at the bottom and abuts the upper surface of the frame shroud 16. In such embodiments, the bottom surface 108 of the recess 100 would therefore be provided by a portion of the upper surface of the frame shroud 16.

In some embodiments, the space within the recess 100 may be further increased by increasing the height of the recess by extending the recess 100 above the upper surface 22 of the seat shroud 12. In such embodiments, this extension may be provided using an upper wall portion 116 projecting vertically upward from the upper surface 22 of the seat shroud and extending along the side surface 38 from the anterior wall portion 110 to the posterior wall portion 112. The outside/laterally oriented surface of the upper wall portion 116 forms the upper most part of the inside surface 102 of the recess 100 and is continuous with the remainder of the inside surface which is provided by the side surface 38 of the seat shroud 12. By extending upward, the upper wall portion 116 extends into the space directly lateral to and adjacent to the seat 8. In such embodiments, the anterior wall portion 110 and posterior wall portion 112 likewise extend vertically above the upper surface 22 of the seat shroud 12 to project laterally outward from the inside surface 102 at the upper wall portion 116.

In the embodiment shown, the upper wall portion 116 extends only slightly above the upper surface 22 of the seat shroud 12 and does not extend above the upper surface of the horizontal portion of the seat 8. That is, the height or top or uppermost aspect of the recess 100 is above the upper surface 22 of the seat shroud 12, but is below the upper surface of the horizontal portion of the seat 8. In this way, the upper wall portion 116 extends upward to provide additional space within the recess 100 but does not obstruct the driver while entering or exiting the machine 2.

Items may be retained within the recess 100 in a variety of ways. In some embodiments, the recess 100 includes or may be used with one or more materials which are spaced away from the inside surface 102 and extend across the recess 100 from the anterior surface 104 to the posterior surface 106. In some embodiments, this material is a stretchy or elastic material such as a fabric, mesh, netting or cord such as a bungee cord. In some embodiments, the material is permanently affixed to the anterior and posterior surfaces 104, 106 of the recess 100. In other embodiments, the material is removably attachable to the anterior and posterior surfaces 104, 106. In some embodiments, the material is also attached (either permanently or removably) to the bottom surface 108. When items are placed within the recess 100, the stretchable material can stretch outward, away from the inside surface 102, to accommodate items of various sizes. Furthermore, the tension created by this stretching of the material functions to hold the items in place within the recess 100.

Figure 4:
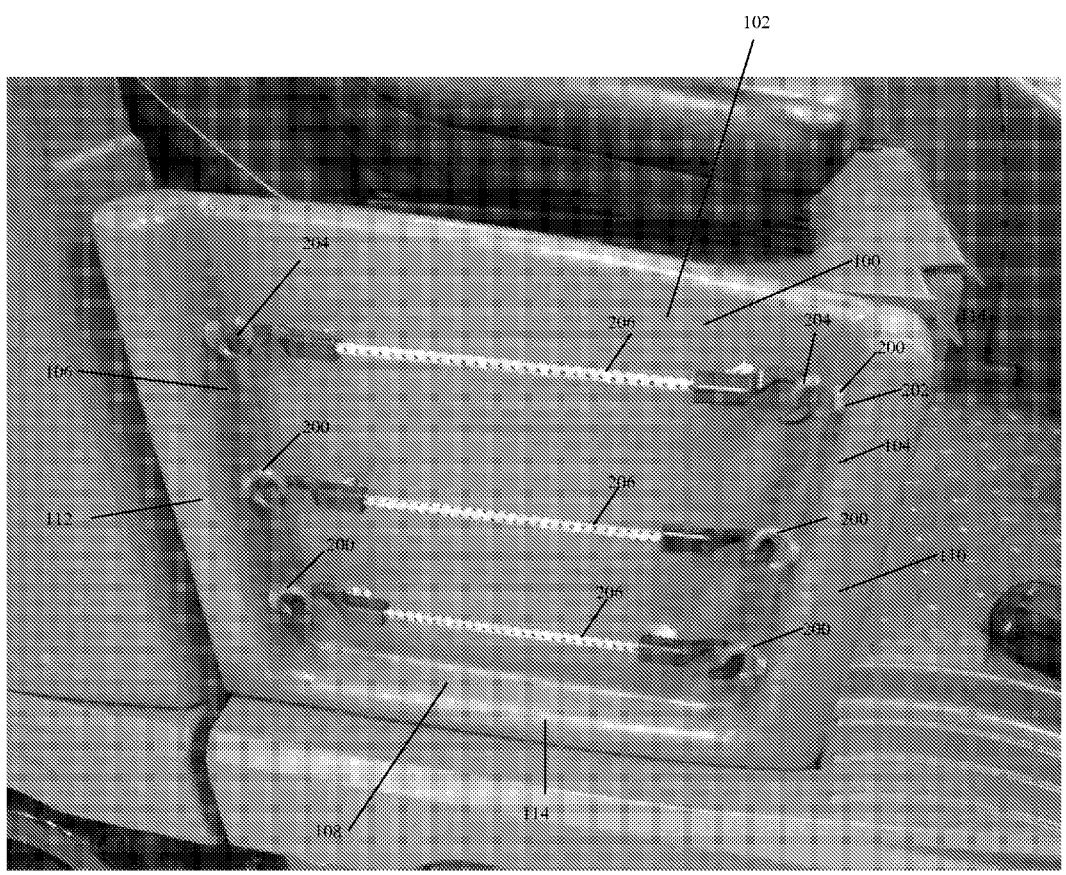
FIG. 4 is a side view of a recess according to embodiments of the invention.

Embodiments of the invention may include attachment mechanisms, such as on the anterior surface 104 and posterior surface 106 of the recess 100, for directly attaching to items to be retained in the recess 100 or for attaching to materials which will be used to hold items within the recess 100. An embodiment including attachment mechanisms 200 is shown in FIG. 4. Examples of attachment mechanisms 200 which may be used include hooks 204, pegs, knobs, snaps, eyelets, and hook and loop material. In some embodiments, the anterior surface 104 and the posterior surface 106 may include one or more apertures 202, such as from one to ten apertures 202. In some embodiments, the anterior surface 104 and posterior surface 106 each include three apertures 202. The attachment mechanisms 200 may be affixed to the anterior and posterior surface 104, 106 by insertion through the apertures 202 or by insertion of a screw or other fixation component through the aperture 202. In some embodiments, the attachment mechanisms 200 are threaded and are sized to be retained within the apertures 202. In some embodiments, a variety of different attachment mechanisms have threaded ends for inserting into the apertures 202 and may be removed and interchanged depending upon the preferred use of the recess 100.

In some embodiments, the recess 100 includes one or more hooks 204, such as three hooks 204, projecting into the recess 100 from each of the anterior and posterior surfaces 104, 106 and functioning as attachment mechanisms 200. In some embodiments, a series of elastic cords 206 may be affixed to the hooks 204, extending from a hook 204 on the anterior surface 104 to a hook 204 at approximately the same height in a parallel location on the posterior surface 106. For example, in embodiments in which there are three hooks 204 spaced along each of the anterior and posterior surface 104, 106 at three different heights, three elastic cords 206 may be connected to the hooks 204 to extend from the anterior surface 104 to the posterior surface 106 such that the cords 206 are approximately horizontal and parallel to each other at different locations across the recess 100. In this way, items may be transported in the recess 100 by placing them inside the recess 100, between the inside surface 102 and the cords 206. The cords 206 will stretch to accommodate items of various sizes and to retain them within the recess 100. Likewise, in other embodiments, the stretchable material may be extended across the recess 100 from the anterior surface 104 to the posterior surface 106 to provide an expandable storage space. As such, items which are larger than the shallow recess 100 may fit be transported within the recess 100 by stretching the elastic material laterally outward and/or extending upward outside of the space defined by the surfaces of the recess 100.

Figures 5A, 5B:
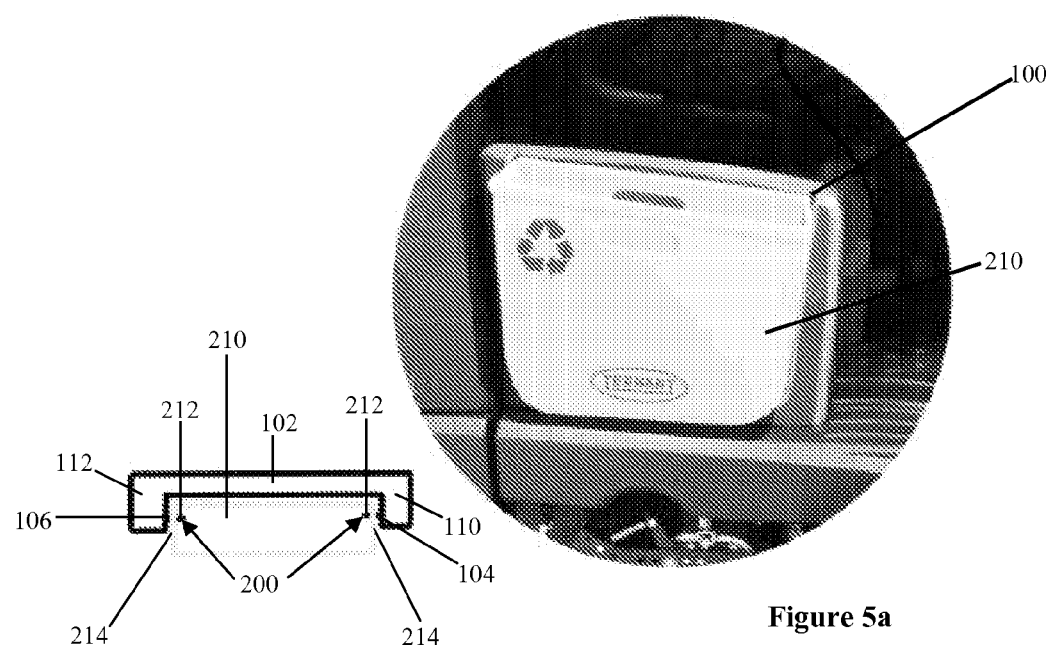
FIG. 5a is a side view of a recess according to embodiments of the invention.
FIG. 5b is a overhead view of a recess according to embodiments of the invention.

In some embodiments, the recess 100 may alternatively be used with a material which is not generally stretchable or is only slightly stretchable but which is soft and/or pliable to allow for expansion. Examples of such materials include ordinary fabric, thin plastics (like that used in plastic bags), paper, sewn or bonded material, and woven and non-woven material. In such embodiments, the material may be in the form of a bag, which may be attached to the recess 100 using the attachment mechanisms 200. For example, the bag may include two or more apertures which are spaced to align with the attachment mechanisms 200. An example of such an embodiment is shown in FIGS. 5*a* and 5*b*. A bag 210 may be inserted within the space of the recess 100 and may be attached to the anterior surface 104 and posterior surface 106 using pegs 212 which insert into apertures 214 in the bag 210, for example. Alternatively, the bag 210 may include eyelets and it may be affixed within the recess 100 by passing hooks installed on the surfaces 104 and 106 through the eyelets. The bag 210 may be soft and flexible, allowing it to collapse as the machine 2 passes adjacent to a wall or other vertical structure. Furthermore, the use of pegs 212 and apertures 214 may allow the opening at the top of the bag 210 to pivot downward to tuck into the recess 100 by pressing flat against the inside surface 102.

In some embodiments, the attachment mechanisms 200 may include hooks 204 or pegs 212 may insert through apertures 214 in a bag 210 to hold the bag 210 within the recess 100. Alternatively, the material of the bag 210 may be sufficiently thin such that it may be pierced by hooks 204 or pegs 212 to create apertures 214 by which the bag 210 may be retained within the recess 100. As the driver acquires items to be stored, such as trash items pick up during the cleaning process, the items may be deposited in the bag 210, which will expand laterally outward as the bag 210 is filled.

Because the recess 100 does not include an outer surface or wall but rather is open on the side facing away from the machine 2, it allows for items to be placed within the recess 100 which are larger than the space defined by the recess 100. That is, the items can expand and project laterally outside of the space of the recess 100. This may be accomplished using stretchable materials as described above, or using a bag 210 which is sized to expand laterally outward as it is filled. In some embodiments, bags 210 may be sized to fit within the space of the recess 100 but to allow for lateral expansion outward beyond the side (or outside the footprint) of the machine 2. That is, the bag 210 may be sized to have length and width dimensions that are almost equal to or are slightly less than that of the recess 100, except for having a depth which may be greater than that of the recess 100. However, because the bag 210 is flexible, it does not protrude outward from the machine 2 when empty, such that the machine 2 still maintains a flat side profile which enables it to run directly adjacent to and abutting a wall. In some embodiments, the bag 210 may be sized to fit within the space of the recess 100 and may be disposable. Alternatively the bag 210 may be recyclable or washable and reusable.

An alternative embodiment is shown in FIGS. 6*a* and 6*b* in which an attachment mechanism 200 is provided in the form of a U-shaped frame 300. The frame 300 is a rod shaped linear member having an anterior portion 304, a posterior portion, and a bottom portion 308 extending between the anterior and posterior portions 304, 306. The anterior portion 304 is vertically oriented with an upper end forming the first end 314 of the frame 300 and the bottom end adjoined to the front end of the bottom portion 308. The posterior portion 306 is vertically oriented with its upper end forming the second end of the frame 300 and the bottom end adjoined to the back end of the bottom portion 308. While the frame 300 as shown is formed from a single member, it could alternatively be formed from three separate rod shaped members including an anterior member, a posterior member and a bottom member, which may or may not be interconnected. In still other embodiments, the frame may include an anterior member and a posterior member but no bottom member.

The frame 300 is affixed to the recess at one or more locations on a surface of the recess by a bracket 320 or other connector. The bracket 320 as shown wraps around a portion of the frame and includes a tab member having a hole through which a screw or rivet may be inserted and drilled into the surface to which it is attached. Between the connectors there are spaces along which the frame 300 is not affixed to the recess. For example, the anterior portion 304 may be affixed to the anterior surface 104, the bottom portion 308 may be affixed to the bottom surface 108 and the posterior portion 306 may be affixed to the posterior surface 106. Alternatively, one or more portions of the frame 300 may be affixed to the inside surface 102 of the recess. In still another alternative, the frame 300 may be affixed to the lateral surface of the seat shroud surrounding but outside of the recess.

The frame 300 may be used for mounting a material to extend across the recess. Such material may be flexible and pliable and/or elastic and stretchable. In some embodiments, the material is a mesh or a netting, such as a cargo netting. The material may be affixed to the frame by wrapping around the frame and being stitched or otherwise fastened (such as by hook and loop material, snap, or adhesive) back onto itself. Alternatively, the material may include holes, such as the spaces in the netting, through which the frame may be inserted to threaded prior to fastening the frame 300 in or around the recess. In this way, the material covers the recess to create an enclosed space which is open on the top and may be used for storage and transportation of items during operation of the vehicle. In embodiments in which the frame 300 includes only a separate anterior member and posterior member but no bottom member, the enclosed space would be open on both the top and bottom.

By providing a recess 100 which lacks an outside wall or surface, the recess 100 is able to carry items which are larger than could be provided by a recess 100 including an outside surface. As described above, the items stored or carried can expend laterally outward outside of the space of the recess 100. In addition, if an outside wall were provided on the machines to form an outside surface, such a wall would necessarily occupy space due to the thickness of the material from which it is constructed, and this would further reduce the space of the recess 100. By eliminating this outside wall and outside surface, no space is lost to such outside wall material, allowing more space to be provided within the recess 100.

The first end 314 and/or second end 316 of frame may be bent to form a hook 204a. In the embodiment shown, the hook 204a is an S-shaped hooked, though any other hook shape may alternatively be used. In such embodiments, the material covered recess may be used for transporting clean, reusable items while the hooks may be used for hanging a bag, such as a garbage bag, into which items such as garbage which will be disposed of may be placed and transported. The bag and its contents may then be detached from the hook and disposed of. In this way, the enclosed recess and the recess cover material are not soiled by the garbage.

In the foregoing detailed description, the invention has been described with reference to specific embodiments. However, it may be appreciated that various modifications and changes can be made without departing from the scope of the invention.

The invention claimed is:

1. A surface maintenance vehicle comprising:
   a vehicle shroud containing operational components of the vehicle;
   a driver's seat;
   a seat shroud comprising:
      a upper surface supporting the driver's seat;
      a side surface forming a lateral wall of the surface maintenance machine; and
      an anterior surface forming a rear wall of a space for a driver's legs; and
   a recessed cavity on the side surface of the seat shroud, the recessed cavity comprising:
      a vertically oriented anterior surface;
      a vertically oriented posterior surface opposing the anterior surface;
      a horizontally oriented bottom surface, wherein the bottom surface is generally perpendicular to the anterior and posterior surfaces; and
      a vertically oriented inner surface, wherein the inner surface is generally perpendicular to the anterior surface, posterior surface and bottom surface;
      wherein the recessed cavity is open on the side and the top.

2. The floor surface maintenance vehicle of claim 1 wherein the recessed cavity comprises only four surfaces.

3. The floor surface maintenance vehicle of claim 1 further comprising a hook within the recessed cavity.

4. The floor surface maintenance vehicle of claim 1 further comprising a first hook affixed to the anterior surface of the recessed cavity and a second hook affixed to the rear wall of the recessed cavity.

5. The floor surface maintenance vehicle of claim 4 wherein the first hook and the second hook are affixed to the recessed cavity at the same horizontal elevation.

6. The floor surface maintenance vehicle of claim 1 wherein the recessed cavity is formed within the side surface of the seat shroud.

7. The floor surface maintenance vehicle of claim 6 wherein the seat shroud is integral with the recessed cavity.

8. The floor surface maintenance vehicle of claim 1 wherein recessed cavity is located entirely within an outer perimeter of the vehicle shroud.

9. The floor surface maintenance vehicle of claim 8 wherein the bottom surface of the recessed cavity has a depth from a lateral edge to an inner edge of the bottom surface of between about 2 and about 6 inches.

10. The floor surface maintenance vehicle of claim 1 further comprising a flexible material extending across the recessed cavity, wherein the flexible material is able to expand laterally outward when an item is placed within the recessed cavity.

11. The floor surface maintenance vehicle of claim 10 wherein the flexible material is affixed to the anterior and posterior surfaces of the recessed cavity.

12. The floor surface maintenance vehicle of claim 11 wherein the flexible material is further affixed to the bottom surface of the recessed cavity.

13. The floor surface maintenance vehicle of claim 11 wherein the flexible material is affixed to the surfaces by a frame.

14. The floor surface maintenance vehicle of claim 13 wherein an upper end of the frame extends away from the recess surface and is bent into a hook shape.

15. The floor surface maintenance vehicle of claim 10 wherein the flexible material is affixed to the anterior, posterior and bottom surfaces of the recessed cavity by a U-shaped frame extending around along the anterior, bottom and posterior surfaces of the recessed cavity and having a first end extending into the cavity from the anterior surface to form a hook and a second end extending into the cavity from the posterior surface to form a hook.

16. The floor surface maintenance vehicle of claim 10 wherein the flexible material is a netting.

17. A surface maintenance vehicle comprising:
   a vehicle shroud containing operational components of the vehicle;
   a driver's seat;
   a seat shroud comprising:
      a upper surface supporting the driver's seat;
      a side surface forming a lateral wall of the surface maintenance machine; and an anterior surface forming a rear wall of a space for a driver's legs; and a recessed cavity on the side surface of the seat shroud, the recessed cavity comprising:
- a vertically oriented anterior surface;
- a vertically oriented posterior surface opposing the anterior surface;
- a horizontally oriented bottom surface, wherein the bottom surface is generally perpendicular to the anterior and posterior surfaces; and
- a vertically oriented inner surface, wherein the inner surface is generally perpendicular to the anterior surface, posterior surface and bottom surface;
- wherein the recessed cavity is open on the side and the top;

one or more hooks attached to a surface of the recessed cavity;

a U-shaped frame extending around the anterior, bottom and posterior surfaces of the recessed cavity; and a flexible material attached to the recessed cavity by the U-shaped frame, wherein the flexible material is able to expand laterally outward when an item is placed within the recessed cavity.

18. The surface maintenance vehicle of claim 17 wherein the flexible material is a netting.

19. The surface maintenance vehicle of claim 17 wherein the one or more hooks comprise a first hook formed from a first end of the frame and a second hook formed from a second end of the frame.

20. The surface maintenance vehicle of claim 19 wherein the first and second hooks are S shaped hooks.

* * * * *